ns
United States
Glatzel et al.

[54] THREE LENS ELEMENT WIDE ANGLE OBJECTIVE

[72] Inventors: Erhard Glatzel, Heidenheim/Brenz, Germany; Hans Schulz, deceased, late of Hunibach, Switzerland; Ris Ruth, Im Gehrli 77, Altreu/Selzach; Heinz-Dieter Schulz, Ch 3762 Erlenbach i. S., both of Germany

[22] Filed: Apr. 13, 1970

[21] Appl. No.: 28,022

Related U.S. Application Data

[63] Continuation-in-part of Ser. No. 669,463, Sept. 21, 1967.

[52] U.S. Cl. .................. 350/225, 350/175 SL, 350/176
[51] Int. Cl. ..................................................... G02b 9/12
[58] Field of Search .............. 350/225, 220, 175 SL, 176

[11] 3,661,447
[45] May 9, 1972

[56] References Cited

UNITED STATES PATENTS 2,516,724   7/1950   Roossinov ........................... 350/220

OTHER PUBLICATIONS

Baker; "Problems In Wide-Angle Lens Design" Photogrammetric Engineering Vol. 20, June 1954, pp. 493–500.

*Primary Examiner*—John K. Corbin
*Attorney*—Singer, Stern & Carlberg

[57] ABSTRACT

A three lens element objective having a wide picture angle of about 120° and a relative aperture of about 1:8 and comprising two relatively thick and strongly meniscus-shaped dispersive lens elements between which is arranged with axial air spaces a relatively thick collective lens element.

3 Claims, 1 Drawing Figure

3,661,447
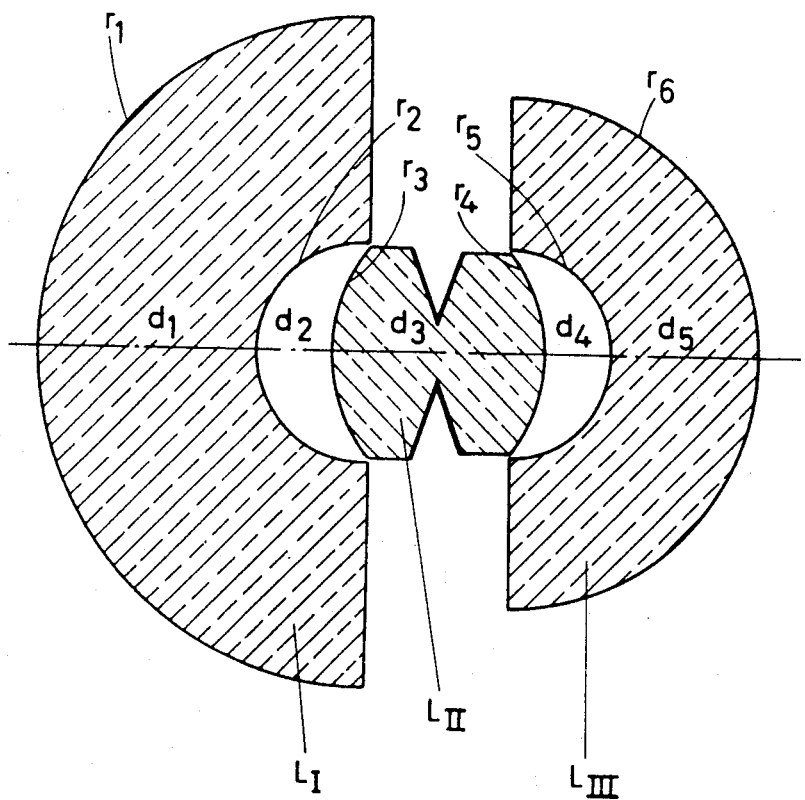

THREE LENS ELEMENT WIDE ANGLE OBJECTIVE

This is a continuation-in-part of U.S. Pat. application Ser. No. 669,463 filed on Sept. 21, 1967 now abandoned.

The invention relates to improvements in wide angle photographic objectives having three lens elements.

The objective of the present invention is provided with three extraordinary shaped lenses, namely two relatively thick and strongly meniscus-shaped curved dispersive elements distinctly separated by air spaces and a likewise relatively thick collective element. In the center of the collective lens is arranged a diaphragm of the objective, namely at the place of the narrowest beam restriction, and this diaphragm has a fixed diameter. All of the boundary faces of the elements (radii) are directed with the concave side toward this pupil. The dispersive elements each closely approximate the property of concentric lenses, i.e. the center points of their radii have each relatively small distances.

With such an arrangement of lens elements it is possible, at a relative aperture of approximately 1:8, to correct at a picture angle of about 120° the spherical, comatic, astigmatic and chromatic imaging errors, and beyond this it is possible and a particular advantage to eliminate the picture field curvature and distortion.

Theoretic considerations, particularly the ones concerning "thin lenses," disclose that when employing three lens elements in addition to the solution with positive outer elements which have arranged between them a dispersive element, there is available a second solution with negative outer elements which have arranged between them a collective lens element. A practical embodiment of the second solution heretofore has not become known.

It is now an object of the invention to disclose such an objective, but first of all such a solution with negative outer elements will be explained theoretically, whereby the problem will be specialized in the following manner:

In addition to the refractive powers $\phi_1$, $\phi_2$ and $\phi_3$, (i.e. phi$_1$, phi$_2$ and phi$_3$) of three thin lens elements only the axial distances or spacings $d_1$ and $d_2$ of these lens elements and thereby only the problem of symmetric objectives will be considered in which $\phi_1 = \phi_3$, $d_1 = d_2$.

It is known that in symmetric objectives, when the beams of light pass symmetrically through the same, a number of imaging errors disappear, such as coma, distortions and chromatic enlarging differences. A few remnants of these imaging errors are, however, still present when symmetric objectives are not symmetrically penetrated by the beams of light, for instance, when the subject lies in infinity and the image in the finite range, as it is assumed in the following, but this is only a problem of fine correction to eliminate these remnants with the assistance of the permissible asymmetries in the objective. There remain in this case only three unknown values $\phi_1$, $\phi_2$ and $d_1$ for the determination of which the following equations may be used:

The total refractive power is made standard to 1. From
$\phi_1 + \phi_2 + \phi_3 - d_1\phi_1(\phi_2 + \phi_3) - d_2\phi_3$ $$(\phi_1 + \phi_2) + d_1 d_2 \phi_1 \phi_2 \phi_3 = 1 \quad (1)$$

follows for the special case of the symmetric objective $$(1 - d_1 \phi_1)(2\phi_1 + \phi_2 - d_1 \phi_1 \phi_2) = 1 \quad (2)$$

Furthermore, a rear intercept length s' is provided. At a total refractive power of 1 follows:

$$1 - d_1 \phi_1 - d_2 (\phi_1 + \phi_2) + d_1 d_2 \phi_1 \phi_2 = s' \quad (3)$$

and in the special case of a symmetric objective:

$$1 - d_1 (2\phi_1 + \phi_2 - d_1 \phi_1 \phi_2) = s' \quad (4)$$

In a third determination equation the Petzval value is to be incorporated which reads:

$$\frac{\varphi_1}{n_1} + \frac{\varphi_2}{n_2} + \frac{\varphi_3}{n_3} = P \quad (5)$$

wherein $n_1$, $n_2$ and $n_3$ denote the refractive indices of the three lens elements. At a symmetric structure one obtains with $n_1 = n_3$:

$$\frac{2\varphi_1}{n_1} + \frac{\varphi_2}{n_2} = P \quad (6)$$

After a further simplification is made with $n_1 = n_2$ and $P = 0$, the final equation reads $$2\phi_1 + \phi_2 = 0 \quad (7)$$

(Further below a solution for the general case $P$ unequal to 0 and $n_1$ unequal to $n_2$ will be given.)

As a result one obtains easily, after a simplification of equation (2) with the assistance of (4) for a later use:

$$(1 - d_1\varphi_1)\frac{(1 - s')}{d_1} = 1 \text{ when } d_1 \neq 0 \quad (8)$$

Equation (7) gives $\phi_2 = -2\phi_1$ and this inserted into (4) results in $$1 - 2d_1^2\varphi_1^2 = s' \quad (9)$$

(8) and (9) are two determination equations for the two unknown values $d_1$ and $\phi_1$ with s' as parameter. (9) is a quadratic equation for the product $d_1 \cdot \phi_1$ and has the two following solutions:

$$d_1 \cdot \varphi_1 = \pm \sqrt{\frac{1-s'}{2}} \quad (10)$$

As will be shown presently, the upper fore sign of the root leads to the solution with positive outer lens elements and the lower fore sign leads to the solution with negative lens units. If one uses the abbreviation $$x = \pm \sqrt{\frac{1-s'}{2}} \quad (11)$$

one obtains from (8) and then from (10) the desired result for $d_1$, $\phi_1$ and then $\phi_2$ according to (7):

$$d_1 = (1-x)(1-s'); \varphi_1 = \frac{x}{d_1}; \varphi_2 = -2\varphi_1 \quad (12)$$

The here not interesting case $d = 0$, i.e. $s' = 1$ (and $s' = -1$ for the upper fore sign in (11)) is not possible according to (8).

It is now easy to recognize that within the range $-1 < s' < 1$ the value d for both solutions remains always positive, and from (10) follows that was to be shown: The refractive powers of the outer lens elements of a triplet may be positive and also may be negative.

In the following a numerical example will show this:

$$s' = 0.87828$$

Solution with positive outer lens elements:

$$d_1 = 0.092 \quad \phi_1 = 2.69 \quad \phi_2 = -5.38$$

Solution with negative outer lens elements:

$$d_1 = 0.152 \quad \phi_1 = -1.63 \quad \phi_2 = 3.25$$

Selecting in place of the simplified condition (7) the general condition (6) with $$n_1 \cdot P \text{ and } \frac{n_1}{n_2}$$

as parameter, then one obtains with the abbreviations $$A = \frac{n_1 P(1-s')}{2}; B = \frac{1}{2}\left(\frac{n_1}{n_2} - 1\right)$$

the following solution:

$$x = \frac{1}{(1+A)}\left(\pm\sqrt{\frac{(1-s')}{2}\frac{n_1}{n_2}(1-n_1P+A)+B^2} + A - B\right) \quad (13)$$

$$d_1 = (1-x)(1-s'); \varphi_1 = \frac{x}{d_1}; \varphi_2 = \frac{n_2}{n_1}(n_1P - 2\varphi_1) \quad (14)$$

This result generally valid for symmetric objectives composed of three thin lenses does not reveal anything that is essentially new as compared with the simplified result of (11) and (12). Moreover, it again runs up to the fine correction to make use of the differentiation of the refractive values $n_1$ and $n_2$ and of the $P$ unequal to 0 (zero) condition.

More important is the elimination of some substantial image errors which have been disregarded in the theory of "thin lenses" used so far, as above all the spherical aberration, astigmatism, and the obliquely spherical abberation. For the correction of these imperfections may be utilized the lens curvatures and the lens thicknesses.

The solution for positive outer lenses has since long been known. Small lens thicknesses and "normal" lens curvatures are capable of eliminating such image errors for relatively large aperture conditions up to about 1:2.8 but for relatively small picture angles up to about $2w_1 = 55°$.

The solution involving negative outer lenses will in the following be demonstrated by way of an exemplary numerical embodiment. According to the invention, the last named image errors are eliminated by means of great lens thicknesses and unusually strong lens curvatures though only for small apertures up to preferably 1:8, but for extremely large picture angles up to preferably $2w_1 = 120°$.

The great thicknesses of the dispersion lens elements which according to the invention are each greater than the thicknesses of the adjacent air spaces have on one hand the effect that together with the strongly meniscus-shaped curvature of the negative outer lens elements the value of the Petzval sum $P$ in the equation (6) valid for thin lens elements may remain substantially greater than zero also in the flattened picture field, so that the absolute powers of refraction may become smaller, as it is obvious from (13) and (14) for usable values of the parameters s' and $n_1/n_2$ which has a favorable effect on all the last mentioned image errors, while on the other hand the penetration level on the dispersive faces become smaller which has the result that an improved correction of the spherical aberration may be obtained.

In accordance with the invention, the dispersion lens elements are curved meniscus-shaped in such a manner that the center points of their boundary radii each have a spacing which is smaller than 50 percent of the thickness of the associated dispersion lens element. With the assistance of this feature the angle of incidence of the light rays of the oblique beams on these surfaces is relatively small. If now in accordance with the invention the thickness of the center lens element is made relatively great, namely greater than the sum of the axial air spaces, and if also these air spaces are each greater than 5 percent of the total focal length of the objective, then a good correction of the astigmatic image defects, including those of a higher order, as well as of the oblique spherical abberation is obtained.

The chromatic correction is obtained when the outer lens elements consist of a glass having small values of the Abbe number $\nu_1$ and $\nu_3$ and when the collective lens element consists of a glass having a great value of the Abbe number $\nu_2$, whereby $1/\nu_1$ and $1/\nu_3$ are each greater about at least 0.01 than $1/\nu_2$.

The accompanying drawing illustrates by way of example one embodiment of the objective of the invention in the form of a sectional view. This objective may have the numerical values as given by way of examples in the Tables I, II and III which follow below. In these tables are designated:

With $L_I$, $L_{II}$ and $L_{III}$ ............ The lens elements.
With $r_1, r_2, r_3, r_4, r_5$ and $r_6$ ... The radii.
With $d_1, d_2, d_3, d_4$ and $d_5$ ..... The axial distances.
With $n_d$ ............................. The refractive indices.
With $\nu_d$ ............................. The Abbe numbers for the d-line of the spectrum.

TABLE I

| Lens elements | Radii | Axial distances | $n_d$ | $\nu_d$ | $\Delta_{n,r}$ |
|---|---|---|---|---|---|
| $L_I$ | $r_1 = .7760 \cdot f$ | | | | $1.03759/f$ |
| | | $d_1 = .5319 \cdot f$ | 1.80518 | 25.46 | |
| | $r_2 = .2562 \cdot f$ | | | | $-3.14248/f$ |
| | | $d_2 = .1802 \cdot f$ | | | |
| | $r_3 = .3779 \cdot f$ | | | | $1.88677/f$ |
| $L_{II}$ | | $d_3 = .5099 \cdot f$ | 1.71300 | 53.89 | |
| | $r_4 = -.3672 \cdot f$ | | | | $1.94184/f$ |
| | | $d_4 = .1603 \cdot f$ | | | |
| | $r_5 = -.2419 \cdot f$ | | | | $-3.32870/f$ |
| $L_{III}$ | | $d_5 = .3491 \cdot f$ | 1.80518 | 25.46 | |
| | $r_6 = -.5989 \cdot f$ | | | | $1.34437/f$ |

Focal length $f$ = 1.0000.
Intercept length = $0.3028 \cdot f$
Relative aperture = 1 : 8.0.
Picture angle = $\pm 60°$.
Length of objective = $1.7313 \cdot f$.

TABLE II

| Lens elements | Radii | Axial distances | $n_d$ | $\nu_d$ | $\Delta_{n,r}$ |
|---|---|---|---|---|---|
| $L_I$ | $r_1 = .7661 \cdot f$ | | | | $1.02426/f$ |
| | | $d_1 = .5182 \cdot f$ | 1.78470 | 26.08 | |
| | $r_2 = .2640 \cdot f$ | | | | $-2.97229/f$ |
| | | $d_2 = .1670 \cdot f$ | | | |
| | $r_3 = .4133 \cdot f$ | | | | $1.90724/f$ |
| $L_{II}$ | | $d_3 = .5665 \cdot f$ | 1.78831 | 47.39 | |
| | $r_4 = -.3969 \cdot f$ | | | | $1.98617/f$ |
| | | $d_4 = .1405 \cdot f$ | | | |
| | $r_5 = -.2450 \cdot f$ | | | | $-3.20223/f$ |
| $L_{III}$ | | $d_5 = .3810 \cdot f$ | 1.78470 | 26.08 | |
| | $r_6 = -.6301 \cdot f$ | | | | $1.24529/f$ |

Focal length $f$ = 1.0000.
Intercept length = $0.2648 \cdot f$
Relative aperture = 1 : 5.6.
Picture angle = $\pm 55°$
Length of objective = $1.7732 \cdot f$.

TABLE III

| Lens Elements | Radii | Axial Distances | $n_d$ | $\nu_d$ | $\Delta_{n,r}$ |
|---|---|---|---|---|---|
| $L_I$ | $r_1 = .6324 \cdot f$ | | | | $1.24087/f$ |
| | | $d_1 = .3286 \cdot f$ | 1.78470 | 26.08 | |
| | $r_2 = .2750 \cdot f$ | | | | $-2.85309/f$ |
| | | $d_2 = .2892 \cdot f$ | | | |
| | $r_3 = .3327 \cdot f$ | | | | $1.93139/f$ |
| $L_{II}$ | | $d_3 = .4714 \cdot f$ | 1.64250 | 57.96 | |
| | $r_4 = -.4244 \cdot f$ | | | | $1.51391/f$ |
| | | $d_4 = .0919 \cdot f$ | | | |
| | $r_5 = -.2073 \cdot f$ | | | | $-3.78521/f$ |
| $L_{III}$ | | $d_5 = .1965 \cdot f$ | 1.78470 | 26.08 | |
| | $r_6 = -.4805 \cdot f$ | | | | $1.63314/f$ |

Focal length $f$ = 1.0000.
Intercept length = $0.5265 \cdot f$.
Relative aperture = 1 : 8.
Picture angle = $\pm 45°$.
Length of objective = $1.3776 \cdot f$.

If one compares the above development of the solution of the problem of designing triplet objectives with negative outer lens elements with the theory of "thin lenses," which latter employs the designations $d_1$, $d_2$ and s', with the values of the above examples, one must consider that these designations at a system composed of thick lens elements change over into corresponding principal plane spacings. For the disclosed embodiment in TABLE I and $f=1$ this means: s' as the distance of the rear principal plane of the last lens element from the focal point of the total objective is 0.87828. $d_1$ as the distance between the rear principal plane of the first lens element and the front principal plane of the second lens element is 0.1238. $d_2$ as the distance between the rear principal plane of the second lens element and the front principal plane of the third lens element is 0.1328.

The powers of refraction have the values:

$$\phi_1 = -1.1440 \quad \phi_2 = 2.7388 \quad \phi_3 = -1.1188$$

With the refractive indices from the TABLE I the result will be:

$$\frac{\varphi_1}{n_1} + \frac{\varphi_2}{n_2} + \frac{\varphi_3}{n_3} = .3453$$

What we claim is:
1. A three lens element wide angle photographic objective with spherical and astigmatic as well as image curvature and distortion correction, comprising two meniscus-shaped curved dispersive lens elements and a biconvex collective lens element disposed between said dispersive lens elements and separated therefrom by air spaces, the axial thicknesses of said dispersive lens elements being each greater than the axial widths of the adjacent air spaces; the thickness of the collective lens element is greater than the sum of the widths of said air spaces and these air spaces being each between 9 percent and 29 percent of the total focal length of the objective, while the center points of the radii of the boundary faces of each of said dispersive lens elements are disposed within said objective and have a distance from each other less than 50 percent of the associated thickness of the dispersive lens element and the length of the objective is greater than the focal length of the objective.

2. An objective according to claim 1, with additional chromatic correction, and in which the reciprocal values of the Abbe numbers of the dispersive lens elements are each between 0.01 and 0.03 greater than the reciprocal value of the Abbe number of the collective lens element.

3. A three lens element wide angle photographic objective with spherical and astigmatic as well as image curvature and distortion correction, comprising two meniscus-shaped curved dispersive lens elements and a biconvex collective lens element between said dispersive lens elements and separated therefrom by air spaces, said objective having numerical data substantially as set forth in the following table:

TABLE

| Lens elements | Radii | Axial distances | $n_d$ | $\nu_d$ | $\Delta_{n,r}$ |
|---|---|---|---|---|---|
| $L_I$ | $r_1 = .7760 \cdot f$ | | | | $1.03759/f$ |
| | | $d_1 = .5319 \cdot f$ | 1.80518 | 25.46 | |
| | $r_2 = .2562 \cdot f$ | | | | $-3.14248/f$ |
| | | $d_2 = .1802 \cdot f$ | | | |
| $L_{II}$ | $r_3 = .3779 \cdot f$ | | | | $1.88677/f$ |
| | | $d_3 = .5099 \cdot f$ | 1.71300 | 53.89 | |
| | $r_4 = -.3672 \cdot f$ | | | | $1.94184/f$ |
| | | $d_4 = .1603 \cdot f$ | | | |
| $L_{III}$ | $r_5 = -.2419 \cdot f$ | | | | $-3.32870/f$ |
| | | $d_5 = .3491 \cdot f$ | 1.80518 | 25.46 | |
| | $r_6 = -.5989 \cdot f$ | | | | $1.34437/f$ |

Focal length $f$ = 1.0000.
Intercept length = $0.3028 \cdot f$.
Relative aperture = 1 : 8.0.
Picture angle = $\pm 60°$.
Length of objective = $1.7313 \cdot f$.

Wherein $L_I$, $L_{II}$ and $L_{III}$ denote the individual lens elements; $r_1$ to $r_6$ denote the radii of the refracting surfaces; $d_1$, $d_3$ and $d_5$ denote the axial thicknesses of the lens elements; $d_2$ and $d_4$ denote the axial separation of the lens elements; $n_d$ denotes the refractive indicies of the glass of the three lens elements; and $/\nu_d$ denotes the Abbe number of the lens elements.

* * * * *